United States Patent [19]
Haas

[11] 3,793,938
[45] Feb. 26, 1974

[54] APPARATUS FOR PRODUCING TUBULAR WAFFLE SHAPES

[76] Inventor: Franz Haas, 25-A1210 Gerstlgasse, Vienna, Austria

[22] Filed: Dec. 13, 1971

[21] Appl. No.: 207,475

[30] Foreign Application Priority Data
Dec. 17, 1970 Austria .............................. 11367/70
June 14, 1971 Austria .............................. 5104/71

[52] U.S. Cl. ............... 99/450.6, 99/450.7, 156/429, 425/391, 425/403
[51] Int. Cl. ......................... A21c 9/06, B65h 54/02
[58] Field of Search .... 99/450.2, 450.3, 450.6, 483; 425/319, 320, 321, 322, 363, 391, 403; 156/195, 429, 425

[56] References Cited
UNITED STATES PATENTS
| | | | |
|---|---|---|---|
| 1,933,557 | 11/1933 | Kalvin | 425/133 |
| 2,989,932 | 6/1961 | Egee et al. | 99/450.3 |
| 1,858,507 | 5/1932 | Jenney | 99/450.2 |
| 1,242,562 | 10/1917 | Laskey | 99/450.2 |
| 2,714,861 | 8/1955 | Castrrnvovo | 99/450.2 X |
| 2,905,105 | 9/1959 | Lombi | 99/450.6 |

FOREIGN PATENTS OR APPLICATIONS
262,187 6/1968 Austria ............................ 99/450.6

*Primary Examiner*—Peter Feldman
*Assistant Examiner*—Alan I. Cantor
*Attorney, Agent, or Firm*—John J. Dennemeyer; Arthur Schwartz

[57] ABSTRACT

An apparatus for producing tubular waffle shapes from a strip of waffle material wound helically on a mandrel in edgewise overlapping relationship, and contacted by steam before overlapping to adhesively bind the adjacent convolutions. The overlapping edges are pressed together by a guide roller to assure good adhesion and the tubular waffle shape is completely filled with a creamy substance and is cut into predetermined lengths before hardening. The guide roller is mounted to feed the strip obliquely on the winding mandrel, and also exerts pressure against the overlapping edges of adjacent convolutions and advances the wound body on the mandrel.

7 Claims, 3 Drawing Figures

APPARATUS FOR PRODUCING TUBULAR WAFFLE SHAPES

The invention relates to apparatus for producing tubular waffle shapes or waffle tubes by winding a strip of waffle material while still in the warm, plastic condition, wherein the strip of waffle material supplied by a continuously working waffle baking machine is continuously wound helically with suitable overlapping and the resulting wound shape is filled with a cream-like substance and cut into pieces of the desired length. A method of this kind is described in Austrian Pat. No. 262,187. In the form of execution of the method described therein the cream-like substance is sprayed on the inner wall of the wound shape which is cut up by sawing after it and the substance sprayed into it has hardened. In order not to delay the hardening excessively, only a small amount of creamy substance may be applied by spraying, so that, depending on requirements, subsequent filling of the hollow waffle shape may be necessary. Nevertheless, the sawing still requires separate cooling action, or at least a longer cooling path for the wound shape before it reaches the cutting station. These circumstances complicate the method in question and make it expensive.

The aim of the invention is a procedure by which completely filled waffle shapes can be produced at reduced cost and with increased output. The invention consists essentially in that the wound shape is completely filled with the cream-like substance and is cut up into desired lengths by shearing before this substance and the wound shape have been hardened. The shearing is effected while the wound shapes are soft and uncooled, at a relatively short distance from the winding and filling station. The complete filling of the wound shape with a creamy substance brings about its immediate stiffening, and above all ensures that the cross-section subjected to shearing will return to the circular shape. The lengths of separated completely filled waffle shapes, can be immediately collected and transported away for shipping and may cool or harden slowly during this transport.

In order to facilitate the building-up of the internal pressure bringing about the stiffening, good sealing or mutual welding of the individual turns of the strip of waffle material is desirable in order to prevent the cream substance from escaping at the sides. According to the invention this is achieved by steaming the overlapping surfaces of the strip of waffle material before overlapping. Such a strip of waffle material usually contains between 30 and 60 percent sugar, glucose, or malt preparations which, under the action of wet heat, start rapidly to dissolve and become sticky. When the first turn is overlapped a tight adhesive sealing is therefore effected immediately and since the activation by the steam is only on the surface this sealed portion hardens within a short time. A correct welding of the overlapped turns of strip material is achieved by the additional application of pressure.

Another aim of the invention is a suitable apparatus for producing filled tubular waffle shapes. For this purpose the invention takes as starting point the apparatus which is likewise known from Austrian Pat. No. 262,187, which has a winding mandrel provided with a longitudinal bore and may be mounted rotatably and adapted to be driven, a guide device, particularly with at least one guide roller for obliquely feeding the strip of waffle material to the winding mandrel and for pushing forward the wound shape formed on the winding mandrel, a pressure device for delivering creamy substance through the longitudinal bore in the winding mandrel into the interior of the wound body, and with a separating device for cutting the endless wound body to length. In the form of construction described the longitudinal bore of the winding mandrel is narrowed at its mouth to form a spray nozzle, and the separating device is a circular saw which must move forward together with the continuously advanced wound body during the separating operation and for this purpose is provided with special driving devices. Since sawing requires complete hardening and even requires that the waffle shape should be brittle, the saw is disposed at a sufficient distance from the winding mandrel, and the endless waffle shape is guided by means of special cooled supporting moulds between the winding mandrel and the saw.

The apparatus according to the invention is essentially characterized in that the longitudinal bore in the winding mandrel at least substantially retains its passage cross-section as far as the outlet at the end of the mandrel, and that the separating device are shears. The unimpeded filling bore of the winding mandrel permits complete filling of the wound body with creamy substance using only a small pressure, while the shears permits instantaneous separation of the filled wound body and can therefore be stationary. Since the shearing cut is best made while the waffle shape is still warm and soft, the shears is preferably disposed a short distance from the winding mandrel and it is possible to work at correspondingly higher speed, since no special attention need to be paid to the cooling of the waffle shape.

For the purpose of carrying out the invention with steam treatment use is preferably made of a nozzle which is connected to a source of steam and the steam jet is directed on to the strip of waffle material, preferably into the wedge-shaped winding gap between the arriving strip of waffle material and the first turn of the wound body being produced. Finally, provision is made for the guide roller to be mounted in such a manner that it can be pressed against the winding mandrel in order to permit pressure welding of the turns of the wound body. For this purpose it has been found particularly advantageous to use a guide roller which is disposed parallel to the axis of the winding mandrel and which is provided on its periphery with a screwthread advancing the wound body on the winding mandrel. The screwthread effects multiple application of pressure to the overlapping parts and therefore particularly intimate pressure welding.

One example of construction of the apparatus according to the invention is illustrated diagrammatically in the drawing in which.

Figure 2:
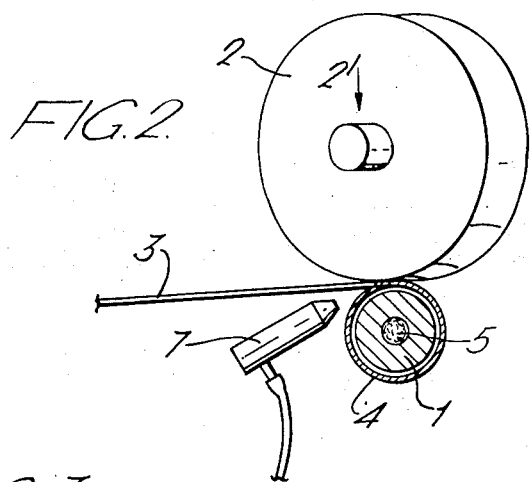
FIG. 2 is a side view, partly in section, along the line II—II in FIG 1.

In the drawings, numeral 1 designates a winding mandrel which may be mounted rotatably and adapted to be driven. A drivable guide roller 2 is mounted above the winding mandrel 1 and disposed obliquly to its axis for the oblique feeding of the strip 3 of waffle material to the winding mandrel 1. The inclination is so selected that the strip 3 of waffle material is overlapped when wound on the winding mandrel. As indicated in FIG. 2, the guide roller 2 is mounted at 2' so that it can be pressed against the winding mandrel 1 in order to weld together the turns of the strip of waffle material wound on to the mandrel at the overlapping point. The roller 2 also continuously advances the wound body 4 on the winding mandrel 1 as it is formed thereon.

Figure 1:
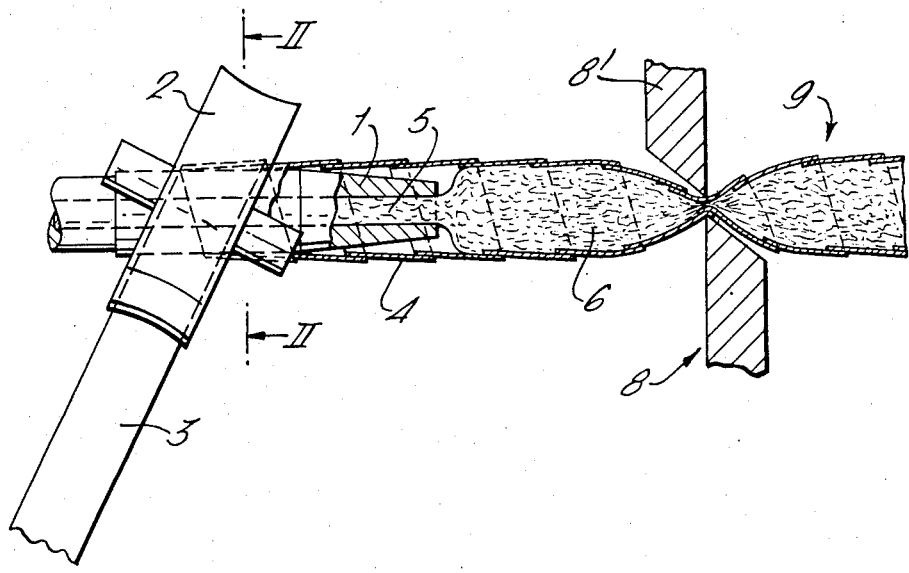
FIG. 1 is a plan view of the apparatus, partly in section.
Figure 3:
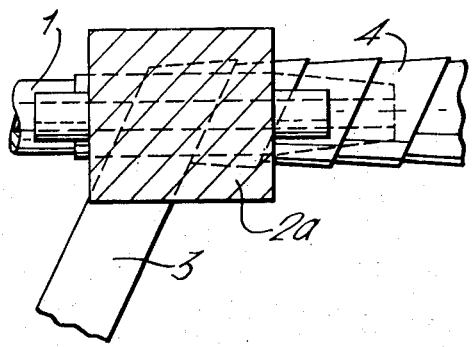
FIG. 3 is a plan view of a modified form of construction of the guide device used in the apparatus according to the invention.

While the guide roller 2 shown in FIG. 1 is provided with a slightly concave peripheral torus and is mounted with its axis inclined in relation to the winding mandrel 1, the guide roller 2a shown in FIG. 3 has its axis parallel to the winding mandrel 1 and carries a multiple screwthread on its periphery, these screwthreads being pressed against the wound body 4 in each case at the lowermost point and thus not only advancing the wound body on the winding mandrel 1 but also effecting the pressure welding of the overlapped turns of the strip 3 of waffle material wound on the mandrel.

Through a longitudinal bore 5 provided in the winding mandrel 1 and connected to a pressure source (not illustrated) for creamy filling substance, this substance 6 passes into the interior of the wound body 4. Due to the unimpeded outlet of the bore 5 the interior of the wound body 4 is thus completely filled with cream 6.

Beneath the guide roller 2 there is situated a nozzle 7 which is connected to a source of steam (not shown) and is directed into the wedge-shaped winding gap between the arriving waffle strip 3 and the first turn of the wound body 4, in order to permit the steaming of the waffle strip directly before the overlapping.

At a relatively short distance from the winding mandrel 1 and the guide roller 2, this distance depending on the production speed selected, there are disposed stationary shears 8 which serves to shear off in a scissors-like action predetermined lengths 9 from the endless wound body 4. By means of the quickest possible cutting movement of the shearing cutter or cutters 8' the continuous advance of the wound body 4 is not hindered. The completely filled waffle shapes 9 cut to length are collected and transported away for shipping or for further processing, during which movement they can cool and solidify slowly.

What is claimed is:

1. A device for the production of filled continuously wound shell-type waffle bodies comprising:
    a. a rotating winding mandrel, said mandrel having a relatively large substantially constant diameter longitudinal bore therethrough, said bore being of sufficient size to flow a cream-like substance therethrough,
    b. guide roller means positioned over the longitudinal axis of said mandrel and adjacent thereto,
    c. means for feeding warm, plastic deformable dough oblique to and over said mandrel in an overlapping manner,
    d. pressure feed means for supplying the cream-like substance through said longitudinal bore to the inside of the wound body,
    e. cutting means for separation of the continuously wound body into discrete lengths, said cutting means including a pair of scissor-like shearing members.

2. A device as defined in claim 1 including means positioned below said guide roller means for spraying a source of steam into the wedge-shaped gap at the point of winding between the dough being fed to the mandrel and the last winding of the body.

3. A device as defined in claim 1 wherein said guide roller means includes a concave outer surface for facilitating the application of pressure against said mandrel.

4. A device as defined in claim 1 wherein the longitudinal axis of said guide roller means is oblique to the axis of said longitudinal bore.

5. A device as defined in claim 1 wherein the longitudinal axis of said guide roller means is parallel to the axis of said longitudinal bore.

6. A device as defined in claim 5 wherein the circumference of said guide roller means is threaded to facilitate the advancing of the body along said mandrel.

7. A device for the production of filled continuously wound shell-type waffle bodies comprising:
    a. a rotating winding mandrel, said mandrel having a relatively large substantially constant diameter longitudinal bore therethrough, said bore being of sufficient size to flow a cream-like substance therethrough,
    b. guide roller means having a longitudinal axis positioned parallel to the longitudinal axis of said mandrel and adjacent thereto, said guide roller means being threaded to facilitate the advancing of the body along said mandrel,
    c. means for feeding warm, plastic deformable dough oblique to and over said mandrel in an overlapping manner,
    d. pressure feed means for supplying the cream-like substance through said longitudinal bore to the inside of the wound body,
    e. cutting means for separation of the continuously wound body into discrete lengths.

* * * * *